Patented Nov. 24, 1942

2,303,068

UNITED STATES PATENT OFFICE 2,303,068

LUBRICANT AND PREPARATION THEREOF

George H. Schoenbaum, Richmond, Va., assignor, by mesne assignments, to Jasco, Incorporated, a corporation of Louisiana No Drawing. Application April 27, 1940, Serial No. 331,940

6 Claims. (Cl. 252—28)

This invention relates to a novel lubricating composition and to methods of preparing same, and more particularly it relates to viscous lubricants containing a finely divided solid filler such as asbestos fiber, for use in heavy mechanical equipment such as tractor roller bearings, etc.

It has been found especially difficult to obtain proper lubrication of tractor rollers primarily due to the fact that these roller bearings are constantly exposed to dirt and dust during use, which if permitted to enter the bearings cause rapid and excessive wear due to the abrasive nature of the dust which usually contains silica. Heretofore people have tried to solve this lubrication problem in several ways but without the proper success. One way was to use a light mineral oil in a completely sealed lubricating system, but this caused trouble and was discontinued by a majority of the larger tractor companies. Another method tried was to use bronze bearings which necessarily leak slightly in order to give satisfactory lubrication but, during use, these frequently leaked too much and therefore ran dry too soon or else they did not leak enough and consequently did not get sufficient lubrication and at the same time permitted dirt and dust to enter the bearings and cause excessive wear. The best method tried heretofore was the use of a lubricant consisting essentially of a cylinder oil base stock and finely divided asbestos fibers; such compositions appeared to satisfactorily prevent dust and dirt from entering the bearings of the tractor rollers but, unfortunately, these compositions were not sufficiently stable during storage, in that the asbestos fibers tended to settle to the bottom of the containers in which the lubricant was stored. The result was that when some of the lubricant was taken from the top of a container it was found substantially deficient in the amount of asbestos whereas a sample taken from the bottom of the container had a substantial excess of asbestos. To illustrate this difficulty some tests are given herewith in Table I showing the percentage of asbestos present in the top and bottom of four different commercial samples.

TABLE I

Prior asbestos lubricants

| | Asbestos content [1], sample— | | | |
|---|---|---|---|---|
| | 1 | 2 | 3 | 4 |
| Total asbestos | 1.32 | 8.30 | 9.91 | 14.8 |
| Percent asbestos at top | 0.64 | 4.55 | 7.62 | 7.3 |
| Percent asbestos at bottom | 1.31 | 12.54 | 10.33 | 17.6 |

[1] The total asbestos was determined according to the method of Federal Specification F4, and the asbestos at the top and bottom was determined by the method of Federal Specification F6, used for stability of asbestos suspensions (determined after 4 hours standing at 300° F.).

The above tests indicate clearly variation between the percent of asbestos at the top and at the bottom of the container.

The present invention has as its chief object overcoming this unstability of the asbestos suspension in such lubricants. Another object of the invention is to prepare stable asbestos lubricants having various contents of asbestos. A still further object is to prepare stable asbestos lubricants having the desired penetration characteristics and also desired adhesiveness or string characteristics. These and other objects and advantages of the invention will be apparent from the following specification.

Broadly the invention comprises incorporating into asbestos lubricants a substantial amount of petrolatum; the amount of the latter required for obtaining proper stability being between the approximate limits of 5% and 50% preferably between about 10% and 40% by weight of the finished blended lubricant. It will be obvious that the exact amount to be used in any specific composition will depend upon several factors such as the type and amount of asbestos fibers or other finely divided solid filler to be suspended, the nature and especially viscosity of the oil base stock, the nature and especially melting point of the petrolatum used, and finally upon the degree of stability required under the conditions of service.

The term petrolatum is intended to mean the so-called amorphous or non-crystallized wax obtained from petroleum oils. These petrolatum waxes may be obtained with a melting point between the approximate limits of 110° F. and 125° F. but for the purpose of the present invention it is preferred to use a petrolatum having a melting point not lower than about 120° F. The petrolatum to be used may be obtained from various types of crude oils but preferably those obtained from paraffinic crudes are used. An exceptionally suitable material is the so-called "Ranger" petrolatum which is one of the commercially available types on the market.

The oil base stock used in preparing the lubricants of this invention should preferably be a mineral oil, although if desired fatty oils such as sperm oil, castor oil, lard oil, etc., can be used in place of part of the mineral oil, and it is preferred to use a relatively heavy cylinder oil stock which should have substantially the following characteristics:

| | |
|---|---|
| Viscosity (Saybolt secs. at 210° F.) | 200–250 |
| Viscosity index minimum | 95 |
| Flash point °F do | 600 |
| Pour point °F maximum | 40 |
| Carbon residue per cent maximum | 3 |
| Neutralization number maximum | 0.10 |
| Naphtha insoluble per cent maximum | 0.1 |
| Corrosion | Nil |

Very satisfactory results have been obtained by using as the oil base stock a cylinder oil having a viscosity between the approximate limitations of 210-230 seconds at 210° F. obtained from a paraffinic crude such as a Pennsylvania oil, although if desired cylinder oil stock may be obtained from other crudes such as naphthenic crudes, particularly if these fractions are deasphaltized.

As the finely divided solid to be suspended in the lubricating oil base stock it is preferred to use asbestos fibers, especially the grade called asbestos shorts or "floats." This product may be obtained from various sources such as Canada, Vermont, etc., and although the nature of the asbestos varies to some extent with its origin and preparation a few trial blends will readily indicate the proper proportions in which it should be blended. The asbestos should preferably have been freed of serpentine rock particles for best results. Although asbestos is mentioned as the preferred material, other finely divided solids of fillers can be used such as wool fiber, cellulose fibers, (rayon) etc. In any case, it is preferred to use substantially moisture-free materials as they tend to produce more stable blended products. Although the amount of asbestos or other filler to be used will depend essentially on the texture and consistency of the lubricant desired (depending on other factors including the viscosity of the cylinder oil and amount and melting point of the petrolatum, etc.), for practical purposes, generally the amount of asbestos should not exceed 20% and usually the maximum will not exceed 16%. The minimum should be at least about 1% and usually at least 3% is required to get substantially the desired effects. For instance, the new Federal specifications call for grades of asbestos lubricants ranged according to their asbestos content as follows: 1—4, 5—8, 9—12, and 13—16.

As an additional optional feature of this invention, another material may be added to impart string or adhesiveness to the lubricant and for such purposes a linear type olefin (preferably iso-olefin) polymer having a molecular weight above 1,000 and perhaps as high as 200,000 or more, but preferably between 10,000 and 100,000 or preferably still between about 30,000 and 80,000, such as polyisobutylene. Such a polymer may be prepared according to known methods, such as by polymerizing isobutylene at temperatures below −10° C. with an active halide catalyst such as boron fluoride, preferably in the presence of an inert solvent such as liquefied propane, ethylene, etc. Owing to the fact that such polymers dissolve rather slowly, it is frequently convenient to prepare them in the form of a concentrated or stock solution such as 1–20% solution of polymer in a light lubricating oil base stock and then the desired amount of this solution may be added to the asbestos, cylinder oil and petrolatum blend. If desired, a volatile solvent may be used instead of or in addition to the lubricating oil diluent for this polymer. A suitable stock solution consists of a 5% by weight solution of a polyisobutylene having a molecular weight of about 70,000 in a lubricating oil base stock having a viscosity of about 40–55 seconds Saybolt at 100° F. Although the amount of this adhesiveness improving agent will depend primarily upon the properties desired in the final product, usually an amount of a polymer such as polyisobutylene corresponding to about .05% by weight of the polyisobutylene of 73,000 molecular weight is sufficient to impart a two inch string to the finished asbestos lubricant.

In carrying out the present invention the materials described above may be blended or compounded in any desired manner. A method which has been found suitable is to heat the cylinder oil to a temperature slightly above the melting point of the petrolatum, then add the required amount of petrolatum with agitation until a uniform solution is obtained and finally add the asbestos, continuing the mixing until a uniform product is obtained. If a material such as polyisobutylene is to be used it is preferably incorporated immediately after addition of the petrolatum. In any case, as soon as the compound is completed the product is poured into suitable containers for storage and shipment and then cooled down to room temperature.

For the sake of illustrating a number of compositions having various proportions of ingredients according to this invention, the following tables are given, including therein the results of various tests on the finished products:

TABLE II

| | Grade | | | |
|---|---|---|---|---|
| | 1 | 2 | 3 | 4 |
| Composition: | | | | |
| Cylinder oil [1] | 87.55 | 58.15 | 53.27 | 50.99 |
| Asbestos | 1.33 | 8.96 | 13.96 | 19.01 |
| Polyisobutylene solution [2] | 1.00 | 1.00 | 0.99 | 1.02 |
| Petrolatum | 10.12 | 31.89 | 31.78 | 28.99 |
| Tests on products: | | | | |
| Asbestos content (percent) | 1.33 | 9.13 | 14.02 | 19.11 |
| Asbestos stability content top (percent) | 0.52 | 9.14 | 14.05 | 19.00 |
| Asbestos stability content bottom (percent) | 1.68 | 9.46 | 14.49 | 19.38 |
| Penetration at 77° F. | >405 | 368 | 357 | 340 |

[1] This mineral oil base stock had the following characteristics:
Viscosity index ------------------------------------------------- 103
S. U. S. at 210° F --------------------------------------------- 223
S. U. S. at 100° F --------------------------------------------- 4001
Pour ------------------------------------------------------- °F-- 30
Corrosion --------------------------------------------------- Nil
Conradson carbon -------------------------------------- percent-- 2.66
Naphtha insoluble ---------------------------------------- do---- 0.01
Neutralization No --------------------------------------------- 0.1
Flash, A. S. T. M. -------------------------------------------- °F-- 610
[2] Refers to 5% solution of 73,000 mol. wt. polyisobutylene in light lubricating oil.

The petrolatum used in the above blends was a No. 5 grade, namely having a melting point of 125° F. The tests on per cent asbestos were made by the same methods referred to previously, namely Federal Specifications F4 and F6. The test results indicate a satisfactory stability in all 4 blends. As indicated by the wide range of penetration figures from greater than 405 down to 340, it is clear that stable asbestos lubricants having practically any desired consistency or penetration may be prepared according to the present invention. Table III shows additional data on blends which are somewhat similar although having different proportions of ingredients, and the tests results are more complete in regard to the consistency under different conditions, and stability of suspension is determined by a different method, namely by centrifuging a sample of the blend for 15 minutes at 4,000 R. P. M. after having been held for 3 hours at 100° F.–110° F.

TABLE III

*Asbestos lubricants*

| Grade | Composition | Consistency | | Penetration after working and allowing to stand 24 hrs. | Stability of suspension (% asbestos) | |
|---|---|---|---|---|---|---|
| | | Penetration | | | | |
| | | Unworked | Worked | | Top | Bottom |
| 1 | 3.0% asbestos floats [1]<br>15.0% petrolatum [2]<br>1.0% polyisobutylene sol'n.[3]<br>81.0% heavy cylinder oil [4] | 450 | 450 | 410 | 2.1 | 4.8 |
| 2 | 8.0% asbestos floats<br>15.0% petrolatum<br>1.0% polyisobutylene sol'n.[3]<br>76.0% heavy cylinder oil [4] | 330 | 400 | 390 | 7.0 | 8.8 |
| 3 | 13.0% asbestos floats<br>20.0% petrolatum<br>1.0% polyisobutylene sol'n.[3]<br>66.0% heavy cylinder oil [4] | 300 | 364 | 232 | 11.9 | 14.0 |
| 4 | 18.0% asbestos floats<br>15.0% petrolatum<br>1.0% polyisobutylene sol'n.[3]<br>66.0% heavy cylinder oil [4] | 240 | 310 | 235 | 17.7 | 18.0 |

[1] Floats from Vermont asbestos mines.
[2] Crude dark green Pennsylvania petrolatum.
[3] Refers to 5% solution of 73,000 mol. wt. polyisobutylene in light lubricating oil.
[4] Paraffinic residual oil having a viscosity of 200 sec. Saybolt at 210° F.

The results in Table III indicate that products having a wide range of consistency, as determined by penetration under various circumstances, may be prepared having satisfactory stability as determined by the new centrifuging test.

It should be understood, of course, that the lubricants of this invention may also be used for other purposes than the lubrication of tractor rollers, for instance, they may be used for gears, transmissions, differentials and chassis of various types of equipment such as trucks, graders and other contractors' equipment. This invention enables the production of stable, stringy, tacky, adhesive, tenacious lubricant of varying consistencies which will provide lubrication for the parts described not only by providing a lubricating film, but also by providing a body to absorb noise and shock, thus reducing wear and prolonging the life and usefulness of such equipment. These lubricants tend to seal the chassis fittings, tractor rollers, etc., thus excluding water, dirt and other foreign material.

It is not intended that this invention be limited to any theory as to the mechanism of the operation of the invention, nor by any of the specific examples which have been given merely for the sake of illustration, but only by the appended claims in which it is intended to claim all novelty inherent in the invention as broadly as the prior art permits.

I claim:

1. A lubricant for heavy mechanical equipment, such as tractor roller bearings and the like which are exposed to dust and dirt during use, which comprises about 50–90% of a mineral oil having a viscosity of about 200–250 seconds Saybolt at 210° F. and a flash point of at least 600° F., about 1–25% of a finely divided, fibrous solid suspended in said mineral oil base stock, and about 5–40% of petrolatum having a melting point not lower than about 110° F., the amount of said petrolatum being sufficient to make the composition stable against separation of the fibrous solid during storage, and said entire composition having an unworked A. S. T. M. penetration of about 200–450 at 77° F.

2. Lubricant according to claim 1 containing a small amount of polyisobutylene having a molecular weight above about 5,000.

3. A lubricant for heavy mechanical equipment, such as tractor roller bearings and the like which are exposed to dust and dirt during use, said lubricant consisting essentially of 50–85% of a cylinder oil obtained from a paraffinic crude petroleum and having a viscosity of about 200–250 seconds Saybolt at 210° F. and a flash point of at least 600° F., 1–20% of asbestos "shorts" free from serpentine rock particles, and about 10–35% of a petrolatum having a melting point not lower than about 120° F., said lubricant having an unworked A. S. T. M. penetration of about 200–450 at 77° F. and being substantially stable against separation of said asbestos during storage.

4. A lubricant according to claim 3 having about a two-inch string and containing a small amount of polyisobutylene having a molecular weight above 5,000.

5. The process of preparing lubricants for heavy mechanical equipment, such as tractor roller bearings and the like which are exposed to dust and dirt during use, which comprises heating 50–90% of mineral oil having a viscosity of about 200–250 seconds Saybolt at 210° F. and a flash point of at least 600° F., to a temperature at least as high as the melting point of the petrolatum to be added, and incorporating therein 1–25% of a finely divided, fibrous solid, and about 5–40% of petrolatum having a melting point not lower than 110° F., the amount of said petrolatum added being at least enough to prevent substantial settling of the fibrous solid from the other ingredients during storage, the proportions of said ingredients used being controlled to provide a finished lubricant having an unworked A. S. T. M. penetration of 200–450 at 77° F.

6. The process of preparing lubricants for heavy mechanical equipment, such as tractor roller bearings and the like which are exposed to dust and dirt during use, which comprises heating 50–85% of a cylinder oil obtained from a paraffinic crude petroleum and having a viscosity of 200–250 seconds Saybolt at 210° F. and a flash point of at least 600° F., to a temperature at least as high as the melting point of the petrolatum to be used, suspending in said cylinder oil about 1-20% of asbestos "shorts" free from serpentine rock particles, and incorporating therein 10-35% of petrolatum having the melting point not lower than about 120° F. and a small amount of polyisobutylene having a molecular weight above 5,000, the amount of the proportions of said ingredients being controlled to produce a finished lubricant having an unworked penetration of 200-450 at 77° F. and about a two-inch string, and substantially stable against separation of the asbestos during storage.

GEORGE H. SCHOENBAUM.